(12) United States Patent
Si

(10) Patent No.: US 10,778,822 B2
(45) Date of Patent: Sep. 15, 2020

(54) HINGE OF MOBILE TERMINAL WITH FLEXIBLE SCREEN AND MOBILE TERMINAL WITH FLEXIBLE SCREEN

(71) Applicant: Hangzhou Amphenol Phoenix Telecom Parts Co., Ltd., Hangzhou, Zhejiang (CN)

(72) Inventor: Mengyu Si, Zhejiang (CN)

(73) Assignee: HANGZHOU AMPHENOL PHOENIX TELECOM PARTS CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 16/630,337

(22) PCT Filed: Jul. 2, 2018

(86) PCT No.: PCT/CN2018/093992
§ 371 (c)(1),
(2) Date: Jan. 10, 2020

(87) PCT Pub. No.: WO2019/011143
PCT Pub. Date: Jan. 17, 2019

(65) Prior Publication Data
US 2020/0162598 A1   May 21, 2020

(30) Foreign Application Priority Data
Jul. 12, 2017 (CN) .................. 2017 1 0564446
Jul. 12, 2017 (CN) .................. 2017 2 0844422 U

(51) Int. Cl.
*H04M 1/02* (2006.01)
*G06F 1/16* (2006.01)
(Continued)

(52) U.S. Cl.
CPC ....... *H04M 1/0268* (2013.01); *H04M 1/0216* (2013.01)

(58) Field of Classification Search
CPC .... H04M 1/02; H04M 1/0216; H04M 1/0268; F16C 11/04; F16C 11/12; F16M 11/04;
(Continued)

(56) References Cited

U.S. PATENT DOCUMENTS 9,798,359 B2 * 10/2017 Seo ................. G06F 1/1652
D828,321 S  *  9/2018 Yeom ................ D14/138 AB
(Continued)

FOREIGN PATENT DOCUMENTS

CN       105830140 A      8/2016
CN       106255935 A     12/2016
(Continued)

*Primary Examiner* — Pablo N Tran
(74) *Attorney, Agent, or Firm* — Muncy, Geissler, Olds & Lowe, PC

(57) ABSTRACT

A hinge for a mobile terminal with a flexible screen, the hinge includes a middle support and left and right side structures which respectively include a left support member and right support member, respectively rotatably connected to a left and right side of the middle support. The hinge has, both in the left and right support members, a space opening towards the middle support and flexible screen. A movement mechanism within the space supports the flexible screen. A U-shaped configuration with an upper portion gradually inclining to be folded is formed in the vicinity of a bending position when the hinge is folded, adapting to the folding/unfolding of the mobile terminal with a flexible screen, enabling the screen to be completely supported when unfolded, creating a smooth transition at the bending position, avoiding damage, and enabling the mobile terminal to achieve a longer service life.

21 Claims, 6 Drawing Sheets

(51) Int. Cl.
*G02F 1/13* (2006.01)
*H05K 1/02* (2006.01)

(58) Field of Classification Search
CPC ........ G06F 1/1652; G06F 1/1681; G06F 1/16;
E05D 3/06; H05K 1/00; H05K 1/11;
H05K 1/02; H05K 1/18; H01L 27/32;
G02F 1/1333
See application file for complete search history.

(56) References Cited

U.S. PATENT DOCUMENTS

| | | | |
|---|---|---|---|
| D859,349 S * | 9/2019 | Yeom | D14/138 AB |
| 10,495,941 B2 * | 12/2019 | Hashimoto | G06F 1/1643 |
| 10,542,128 B2 * | 1/2020 | Kang | G09G 3/3208 |
| 10,571,977 B2 * | 2/2020 | Escamilla | G06F 1/1618 |
| 10,575,415 B2 * | 2/2020 | Shin | H05K 5/0017 |
| 10,585,458 B2 * | 3/2020 | Park | G06F 1/1652 |
| 10,667,416 B2 * | 5/2020 | Si | H05K 5/0017 |
| 10,686,028 B2 * | 6/2020 | Ahn | G06F 1/1618 |
| 2015/0233162 A1 | 8/2015 | Lee et al. | |
| 2016/0302314 A1 | 10/2016 | Bae et al. | |
| 2020/0174522 A1 * | 6/2020 | Lim | G06F 1/1616 |
| 2020/0201400 A1 * | 6/2020 | Jan | G06F 1/1652 |
| 2020/0204666 A1 * | 6/2020 | Hong | G06F 1/1652 |

FOREIGN PATENT DOCUMENTS

| | | |
|---|---|---|
| CN | 106601130 A | 4/2017 |
| CN | 207460248 U | 6/2018 |

* cited by examiner

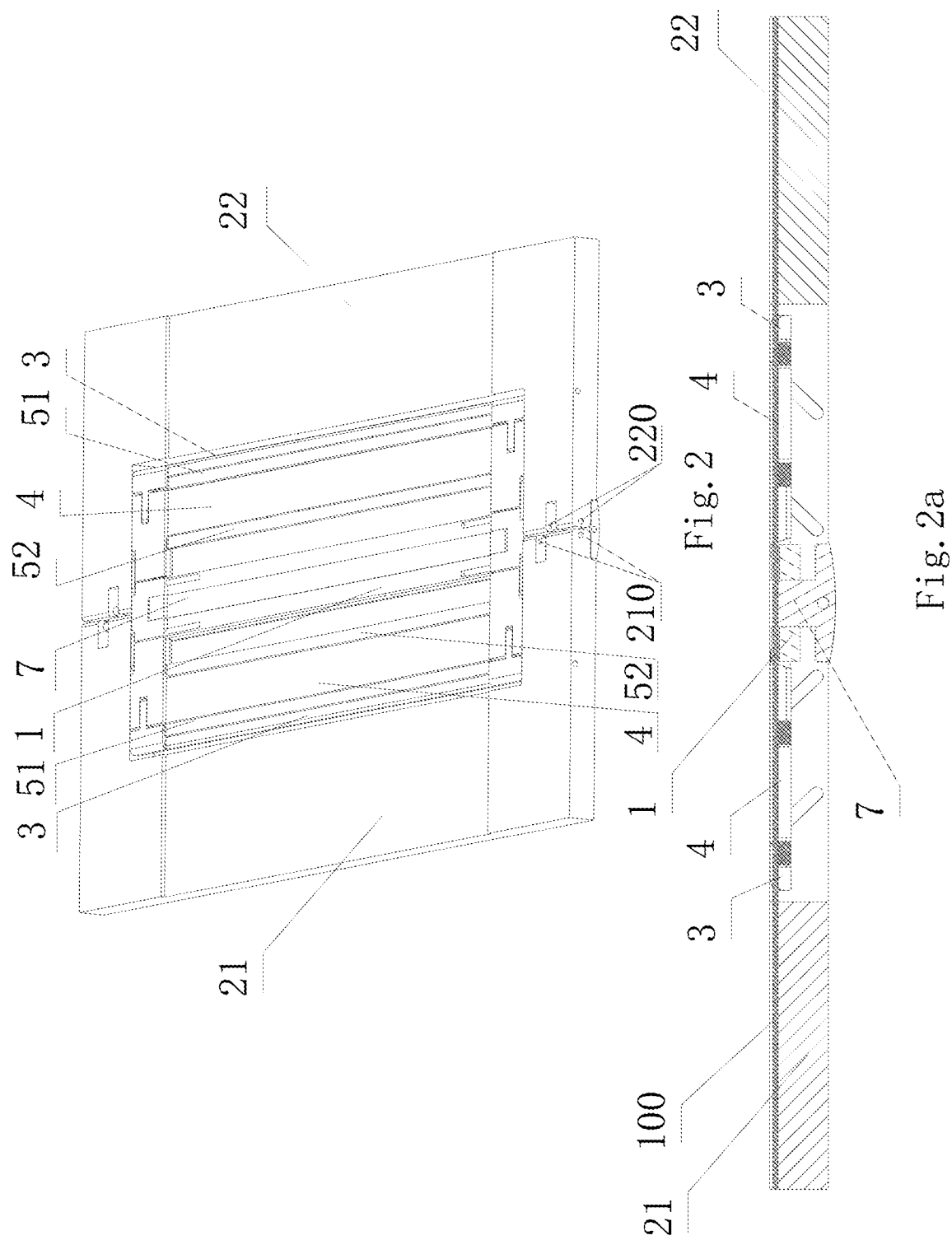

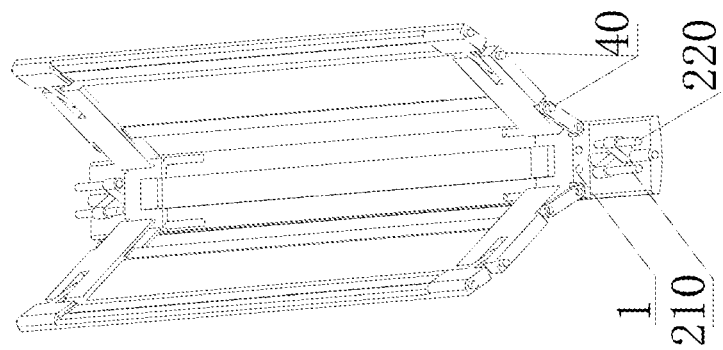
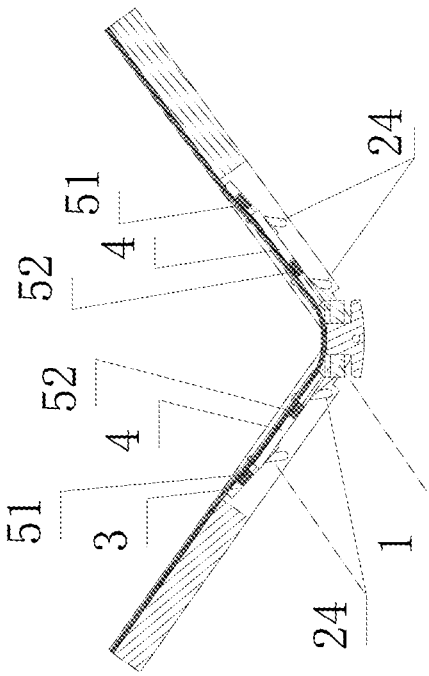
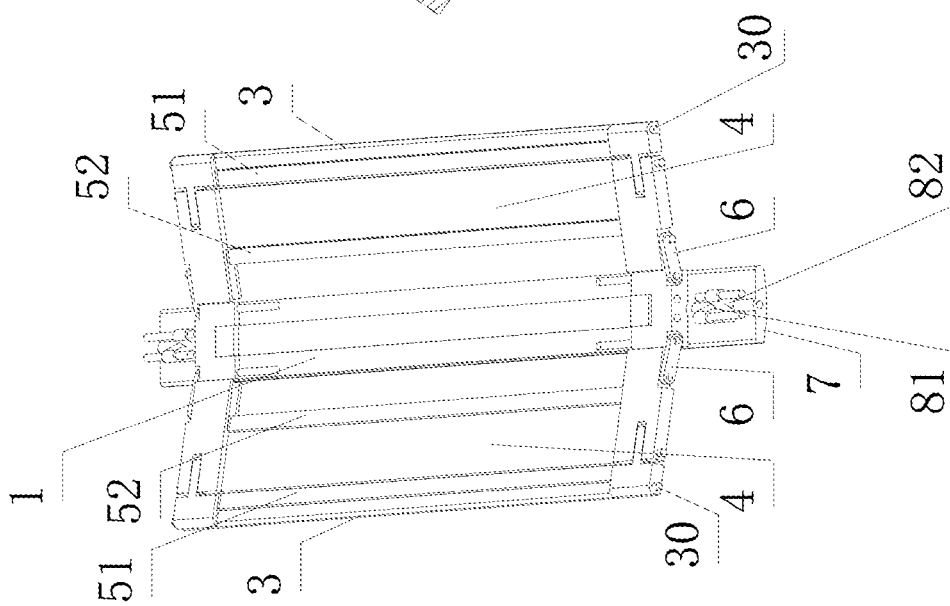

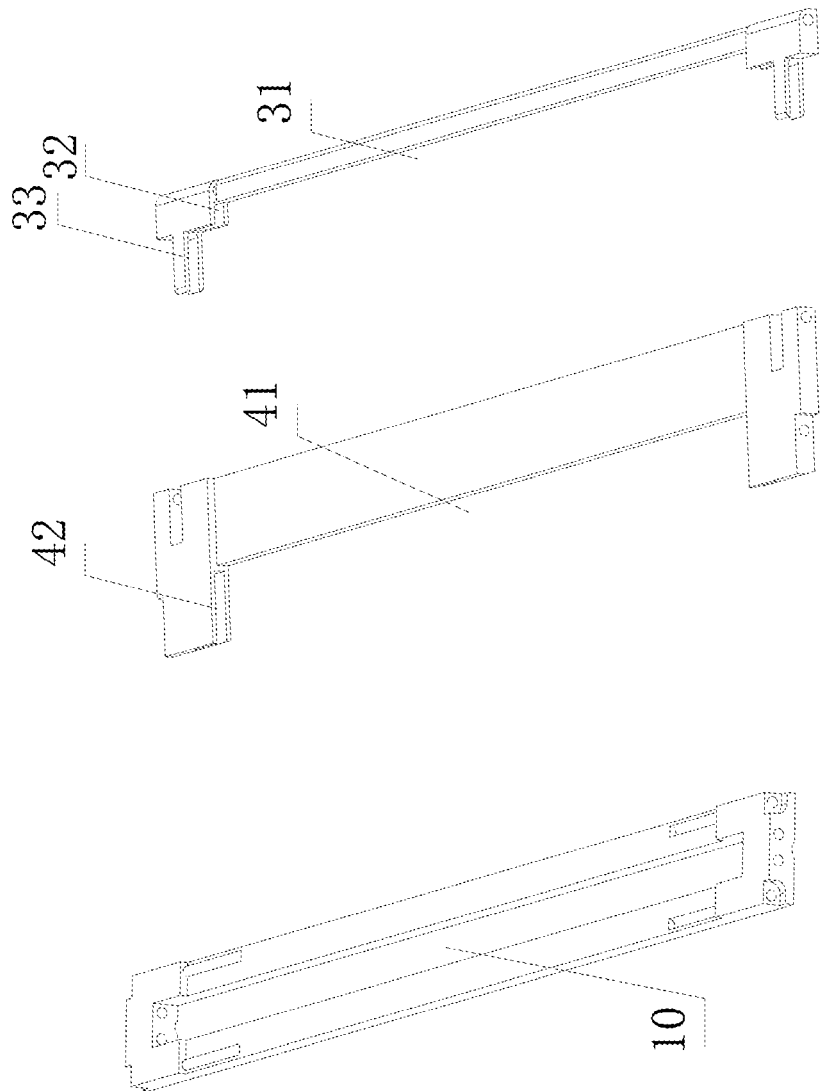
Fig. 8
Fig. 7
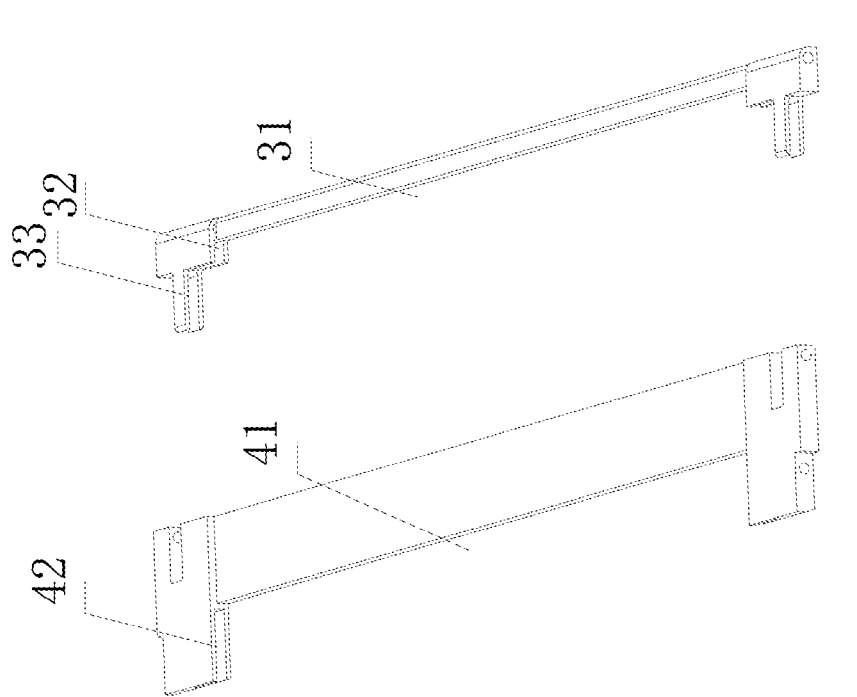
FIG. 6
Fig. 5

HINGE OF MOBILE TERMINAL WITH FLEXIBLE SCREEN AND MOBILE TERMINAL WITH FLEXIBLE SCREEN

FIELD OF THE INVENTION

The present invention relates to a mobile terminal and a hinge thereof.

BACKGROUND OF THE INVENTION

Flexible screens are a kind of emerging screens. For a mobile terminal with a flexible screen whose flexible screen is disposed inside the mobile terminal, it is necessary to deal with the change in length caused by closing and opening of a hinge.

SUMMARY OF THE INVENTION

The technical problem to be solved in the present invention is to provide a hinge for a mobile terminal with a flexible screen, which can be used to a mobile terminal with a flexible screen whose flexible screen is disposed inside the mobile terminal. To achieve this object, the present invention adopts the following technical solutions:

A hinge for a mobile terminal with a flexible screen, comprising a middle support, a left side structure and a right side structure, wherein the left side structure and the right side structure respectively comprise a left support member and a right support member, the left support member and the right support member are respectively rotatably connected to a left side and a right side of the middle support, and the rotating shafts thereof are parallel;

The hinge is provided, both in the left support member and the right support member, with a space opening towards the middle support and the flexible screen, a movement mechanism supporting the flexible screen is provided within the space, the movement mechanism is provided with a flexible screen support with a width not less than the width of the flexible screen; the movement mechanism is provided with a linked rotating flexible screen support member and a lifting flexible screen support member, the lifting direction of the lifting flexible screen support member is relative to the thickness direction of the mobile terminal, when the hinge is folded to be closed, the lifting flexible screen support member descends to a low position, when the hinge is unfolded, the lifting flexible screen support member is raised to a high position;

The rotating shaft of the rotating flexible screen support member is parallel to the rotating shaft of the left support member and the right support member, and the movement mechanism is provided with the rotating flexible screen support member at the end away from the middle support, when the lifting flexible screen support member descends, the rotating flexible screen support member rotates downwards, when the lifting flexible screen support member rises, the rotating flexible screen support member rotates upwards.

The present invention may adopt the following preferred technical solutions, or combination of these preferred technical solutions on the basis of the foregoing technical solutions:

The movement mechanism is connected to the corresponding left support member or right support member to be linked with the corresponding left support member or right support member.

The end of the movement mechanism away from the middle support is connected to the corresponding left support member or right support member through a rotating flexible screen support member, the end of the rotating flexible screen support member away from the middle support is rotatably connected to the corresponding left support member or right support member, the end of the rotating flexible screen support member close to the middle support is connected to the lifting flexible screen support member and can slide and rotate relative to the lifting flexible screen support member, the left side and right side of the middle support are respectively connected to the left side and the right side of the lifting flexible screen support members through a connection mechanism; the lifting flexible screen support member is connected to the corresponding left support member or right support member to be linked with the corresponding left support member or right support member.

The rotating flexible screen support member has a first sliding space opened above and is provided with a guide groove, and the guide groove is connected to a first sliding flexible screen support member, the first sliding flexible screen support member is in the first sliding space and can slide along the guide groove towards and away from the lifting flexible screen support member.

The lifting flexible screen support member has a second sliding space opened above and is provided with a guide groove, and the guide groove is connected to a second sliding flexible screen support member, the second sliding flexible screen support member is in the second sliding space and can slide along the guide groove towards and away from middle support.

The left support member and the right support member are provided with a lifting guide chute of a lifting flexible screen support member, and the lifting flexible screen support member is slidably connected to the lifting guide chute of the corresponding left support member or right support member through a lifting guide shaft.

The rotating flexible screen support member is provided with a guide groove, and is movably insertedly connected to the lifting guide shaft through the guide groove.

The middle support is connected to the lifting flexible screen support member through a link.

The middle support is connected to the lifting guide shaft of the lifting flexible screen support member through a link.

The hinge is further provided with a synchronization mechanism to allow the left support member and right support member to rotate synchronously in a reverse direction.

The left support member and right support member are a shell or a portion constituting a shell, respectively, such that a circuit board of the mobile terminal and components connected to the circuit board are arranged in the shell.

The hinge is further provided with a middle lifting top block, the middle support is provided with a long hole along the width direction of the flexible screen, to guide the lifting of the middle lifting top block, the middle lifting top block is further connected to the left support member and the right support member through a connecting structure, to achieve linkage, the lifting direction of the middle lifting top block is that the middle lifting top block rises to a high position and protrudes out of the long hole when the hinge is folded to be closed, and the middle lifting top block descends to a low position when the hinge is unfolded, to support the middle portion of the unfolded flexible screen.

The middle lifting top block further serves as a synchronization mechanism, to allow the left support member and right support member to rotate synchronously in a reverse direction.

The middle lifting top block is rotatably connected to the left support member and right support member through a first link and a second link, respectively, and the first link and the second link are coaxially rotatably connected to the middle position of the middle lifting top block, the connecting shaft of the first link and the left support member is coaxial with the rotating shaft of the left support member and the middle support, and the connecting shaft of the second link and the right support member is coaxial with the rotating shaft of the right support member and the middle support.

Another technical problem to be solved is to provide a mobile terminal with a flexible screen to which the above hinge is applied. To achieve this object, the present invention adopts the following technical solutions:

A mobile terminal with a flexible screen, provided with any of the above hinge for a mobile terminal with a flexible screen, wherein the flexible screen is connected to the left support member and right support member, the rotating flexible screen support member and the lifting flexible screen support member.

When a first sliding flexible screen support member is provided, the flexible screen is further connected to the first sliding flexible screen support member. When a second sliding flexible screen support member is provided, the flexible screen is further connected to the second sliding flexible screen support member. When a middle lifting top block is provided, the flexible screen is further connected to the middle lifting top block.

With the foregoing technical solutions, the present invention has a rational structure, and the internal structure thereof is simple in action and stable in performance. A relatively wide U-shaped configuration with an upper portion thereof gradually inclining to be folded can be formed in the vicinity of a bending position when the hinge is folded to be closed, thus not only adapting to the requirement of the folding and unfolding of the mobile terminal with a flexible screen, but also enabling the flexible screen to be completely supported when being unfolded, creating a smooth transition at the bending position and avoiding damage, and enabling the mobile terminal to achieve a longer service life.

BRIEF DESCRIPTION OF THE DRAWINGS

FIG. 2 is a schematic view of a hinge embodiment when being unfolded according to the present invention.

FIG. 2a is a sectional view of a hinge embodiment when being unfolded according to the present invention.

FIGS. 3a, 3b, and 3c are schematic views of a hinge at three different opening angles from folding to unfolding, with increasing opening angles in order.

FIG. 5 is a schematic view of a middle lifting top block in a hinge.

FIG. 6 is a schematic view of a middle support in a hinge.

FIG. 7 is a schematic view of a lifting flexible screen support member in a hinge.

FIG. 8 is a schematic view of a rotating flexible screen support member in a hinge.

DETAILED DESCRIPTION OF THE EMBODIMENTS

Figure 1:
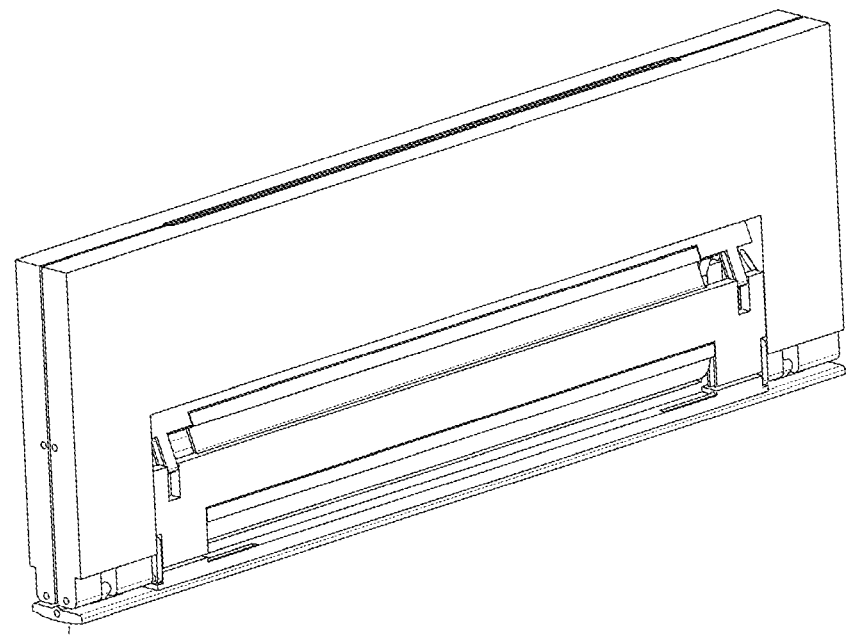
FIG. 1 is a schematic view of a hinge embodiment when folded to be closed according to the present invention.

Referring to the drawings, a hinge for a mobile terminal with a flexible screen is provided in the invention, comprising a middle support 1, a left side structure and a right side structure, and the left side structure and the right side structure respectively comprise a left support member 21 and a right support member 22, the left support member 21 and right support member 22 are respectively rotatably connected to a left side and a right side of the middle support 1, and the rotating shafts 210, 220 thereof are parallel;

The left support member 21 and the right support member 22 assume the main support area of the flexible screen 100. The left support member 21 and right support member 22 can be plates, or a shell of a mobile terminal or a portion constituting a shell. The circuit board of the mobile terminal and components connected to the circuit board are provided in the shell.

Figure 1A:
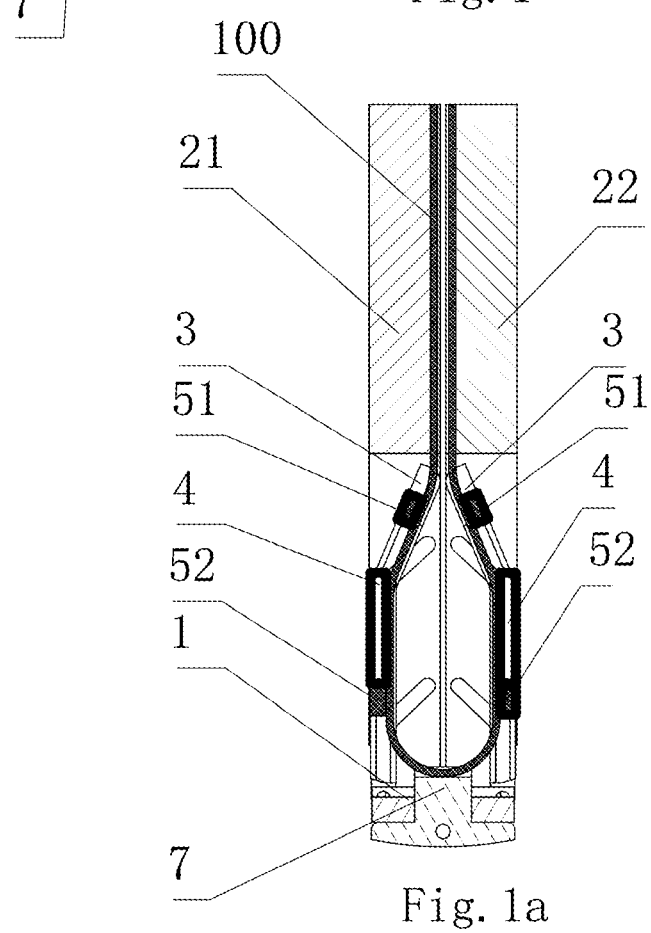
FIG. 1a is a sectional view of a hinge embodiment when folded to be closed according to the present invention.
Figure 4:
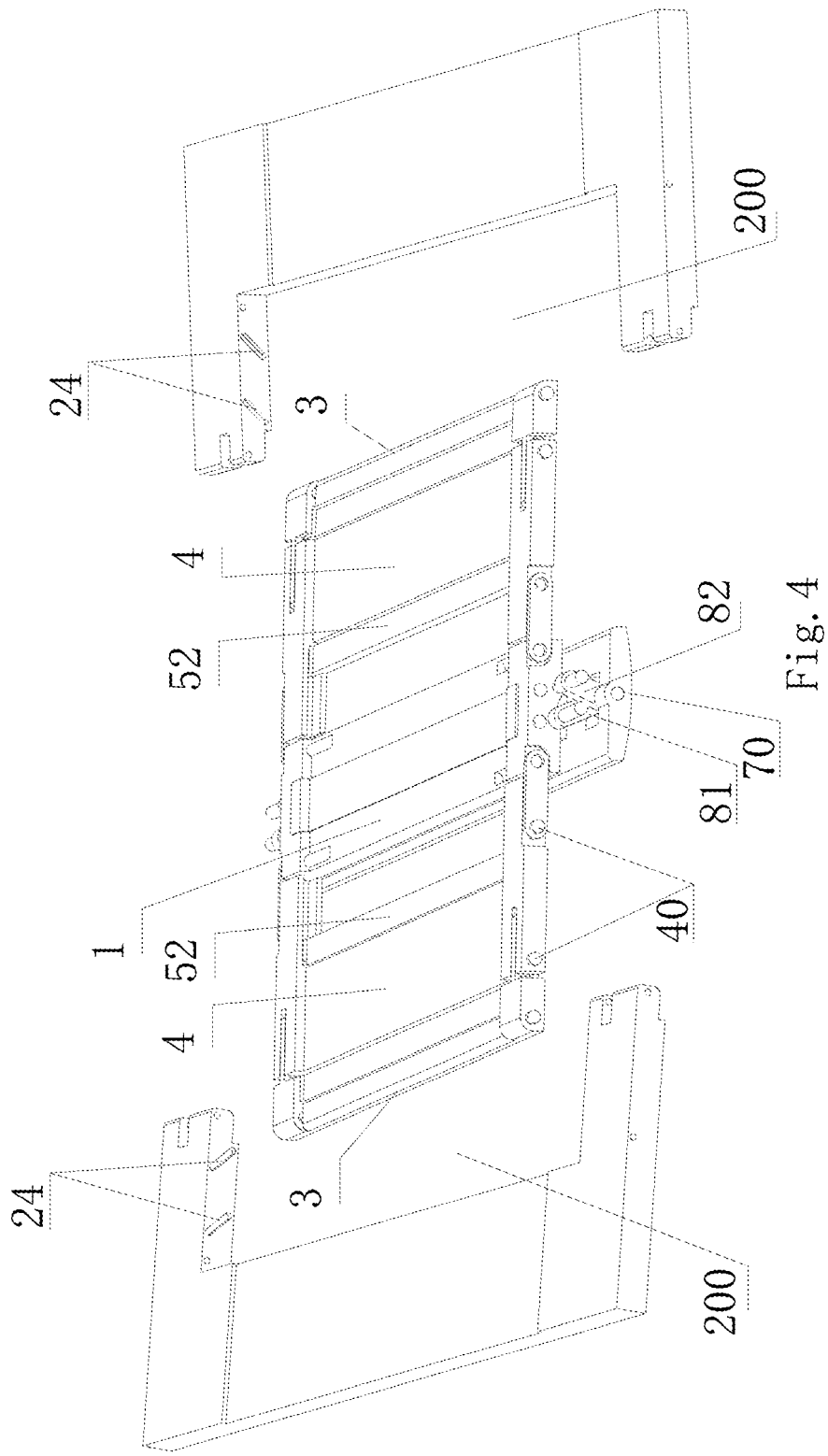
FIG. 4 is an exploded view of a hinge embodiment of the present invention.
Figure 9:
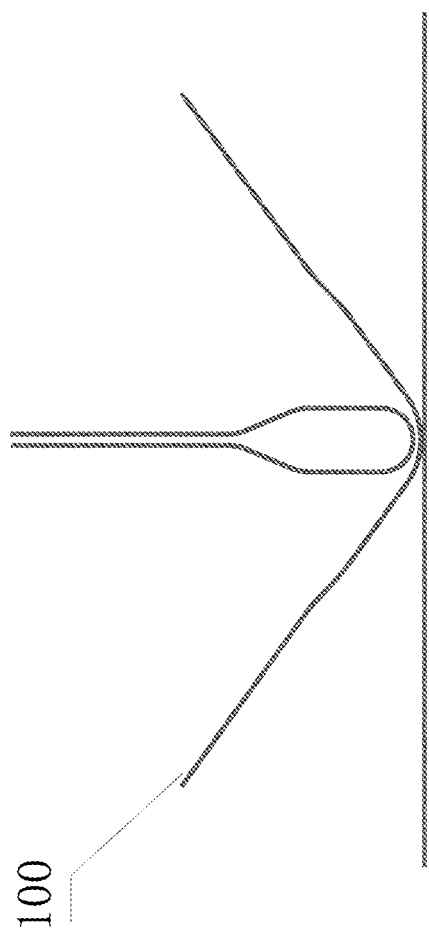
FIG. 9 is a diagram showing the changes of a flexible screen when a hinge is folded and unfolded.

The hinge is provided, both in the left support member 21 and the right support member 22, with a space opening 200 towards the middle support and the flexible screen, a movement mechanism supporting the flexible screen is provided within the space 200, the movement mechanism is provided with a flexible screen support with a width not less than the width of the flexible screen. When the hinge is folded to be closed, a shape as shown in FIG. 1a is formed and when the hinge is unfolded, a shape as shown in FIG. 2a is formed. By inclining, lifting and descending, it can meet the need of the hinge mechanical structure for extension or shrinkage when folded to be closed and unfolded, enabling the flexible screen to be always lain on the movement mechanism, creating a smooth transition at the bending position, and achieving more comprehensive support when being unfolded.

The movement mechanism is provided with a linked rotating flexible screen support member 3 and a lifting flexible screen support member 4, and the lifting direction of the lifting flexible screen support member 4 is relative to the thickness direction of the mobile terminal. When the hinge is folded to be closed, the lifting flexible screen support member 4 descends to a low position (as shown in FIG. 1a), when the hinge is unfolded, the lifting flexible screen support member 4 rises to a high position to support the flexible screen when unfolded (as shown in FIG. 2a). Both the rotating flexible screen support member 3 and the lifting flexible screen support member 4 can be flat parts.

The rotating shaft 30 of the rotating flexible screen support member 3 is parallel to the rotating shafts 210 and 220 of the left support member 21 and right support member 22, and the movement mechanism is provided with the rotating flexible screen support member 3 at the end away from the middle support 1, when the lifting flexible screen support member 4 descends, the rotating flexible screen support member 3 rotates downwards, when the lifting flexible screen support member 4 rises, the rotating flexible screen support member 3 rotates upwards, and when the lifting flexible screen support member 4 rises to a high position, it rotates to a high position to support the flexible screen when unfolded.

Both the left side structure and the right side structure are provided with the movement mechanism, and the movement mechanism is connected to the corresponding left support member 21 or right support member 22, so as to link with the corresponding left support member 21 or right support member 22. When the left support member 21 or the right support member 22 is opened or closed manually, the movement mechanism is driven to move automatically.

Preferably, the end of the movement mechanism away from the middle support 11 is connected to the corresponding left support member 21 or right support member 22 through a rotating flexible screen support member 3, the end of the rotating flexible screen support member 3 away from the middle support 1 is rotatably connected to the corresponding left support member 21 or right support member 22, the end of the rotating flexible screen support member close to the middle support is connected to the lifting flexible screen support member 4 and can slide and rotate relative to the lifting flexible screen support member 4, the left side and right side of the middle support are respectively connected to the left side and the right side of the lifting flexible screen support members 4 through a connection mechanism; the lifting flexible screen support member 4 is connected to the corresponding left support member 21 or right support member 22 to be linked with the corresponding left support member or right support member.

More preferably, the rotating flexible screen support member 3 has a first sliding space 31 and is provided with a guide groove 32, and the guide groove is connected to a first sliding flexible screen support member 51, the first sliding flexible screen support member 51 is in the first sliding space 31 and can slide along the guide groove 32 towards and away from the lifting flexible screen support member 4, and rotate along with the rotating flexible screen support member 3. The lifting flexible screen support member 4 has a second sliding space 41 and is provided with a guide groove 42, and the guide groove 42 is connected to a second sliding flexible screen support member 52, the second sliding flexible screen support member 52 is in the second sliding space 41 and can slide along the guide groove 42 towards and away from middle support 11, and rise and descend along with the lifting flexible screen support member 4. The first sliding flexible screen support member 51 and the second sliding flexible screen support member 52 may also be flat members. The first sliding flexible screen support member 51 and the second sliding flexible screen support member 52 correspond to a relatively wide U-shaped portion with an upper portion thereof gradually inclining to be folded and a relatively wide U-shaped side when the hinge is folded to be closed, respectively. When the hinge is folded to be closed, the flexible screen is quickly bent and formed, and the flexible screen is more fully supported.

Preferably, the left support member 21 and the right support member 22 are provided with a lifting guide chute 24 of a lifting flexible screen support member 4, and the lifting flexible screen support member 4 is slidably connected to the lifting guide chute 24 of the corresponding left support member 21 or right support member 22 through a lifting guide shaft 40. For one lifting flexible screen support member 4, two lifting guide chute 24 are provided. When required, the lifting flexible screen support member 4 may also be composed of multiple pieces, and the lifting guide chute 24 may be added accordingly.

The rotating flexible screen support member 3 is provided with a guide groove 33 in the front of the guide groove 32, and is movably insertedly connected to the lifting guide shaft 40 through the guide groove 33, and can be relatively slid and rotated to form a linkage to connect them together movably.

Preferably, the middle support 1 is connected to the lifting flexible screen support member 4 through a link 6, more preferably, the middle support 1 is connected to the lifting guide shaft 40 of the lifting flexible screen support member 4 through a link 6.

The hinge is further provided with a synchronization mechanism to allow the left support member 21 and right support member 22 to rotate synchronously in a reverse direction.

The hinge is further provided with a middle lifting top block 7, and a lifting guide structure of a middle lifting top block is provided between the middle lifting top block 7 and the middle support 1, and the lifting guide structure is preferably a long guide hole 10 in the middle of the middle support 1, and the middle lifting top block 7 is further connected to the left support member 21 and right support member 22 through the connecting structure, to achieve linkage. The lifting direction of the middle lifting top block 7 is that the middle lifting top block rises to a high position and protrudes out of the long hole 10 (FIG. 1a) when the hinge is folded to be closed, and the middle lifting top block 7 descends to a low position when the hinge is unfolded, to support the middle portion of the unfolded flexible screen (FIG. 2a). In this way, for the formation of a relatively wide U-shaped configuration with an upper portion thereof gradually inclining to be folded near the bending position, not only it is supported in the middle of the flexible screen, but also it has a lifting effect on the bending position when the hinge is folded and closed to bend the flexible screen, which is more convenient for bending the flexible screen and has a protective effect on the flexible screen. The length of the middle top block is not less than the width of the flexible screen.

The middle lifting top block 7 further serves as a synchronization mechanism. Preferably, the middle lifting top block 7 is rotatably connected to the left support member 21 and right support member 22 through a first link 81 and a second link 82, respectively, and the first link 81 and the second link 82 are coaxially rotatably connected to the middle position of the middle lifting top block 7, and it axis is marked 70. The axis 70 can be provided in sections with first link 81 and second link 82, respectively. The connecting shaft of the first link 81 and the left support member 21 is coaxial with the rotating shaft 210 of the left support member 21 and the middle support 1 (the same axis or provided in sections), and the connecting shaft of the second link 82 and the right support member 22 is coaxial with the rotating shaft 220 of the right support member 22 and the middle support 1 (the same axis or provided in sections).

The mobile terminal with a flexible screen that uses the hinge of the present invention, the flexible screen is connected to the left support member and right support member, the rotating flexible screen support member and the lifting flexible screen support member. The left support member and right support member, rotating flexible screen support member, and lifting flexible screen support member participate in forming a support plane when the flexible screen is unfolded.

If the first sliding flexible screen support member 51 and the second sliding flexible screen support member 52, and/or the middle lifting top block 7 are provided, the flexible screen is also correspondingly connected to the first sliding flexible screen support member 51, the second sliding flexible screen support member 52, and/or the middle lifting top block 7. These components together with the left support member and the right support member, the rotating flexible screen support member and the lifting flexible screen support member participate in forming a support plane when the flexible screen is unfolded.

The foregoing description only describes specific embodiments of the present invention, but the structural features of the invention are not limited thereto, any changes or modifications made by those skilled in the art based on the invention shall fall into the scope of protection of the present invention.

The invention claimed is:

1. A hinge for a mobile terminal with a flexible screen, comprising a middle support, a left side structure and a right side structure, wherein the left side structure and the right side structure respectively comprise a left support member and a right support member, the left support member and the right support member are respectively rotatably connected to a left side and a right side of the middle support, and the rotating shafts of the left support member and the right support member thereof are parallel;

the hinge is provided, both in the left support member and the right support member, with a space opening towards the middle support and the flexible screen, a movement mechanism supporting the flexible screen is provided within the space, the movement mechanism is provided with a flexible screen support with a width not less than the width of the flexible screen; the movement mechanism is provided with a linked rotating flexible screen support member and a lifting flexible screen support member, the lifting direction of the lifting flexible screen support member is relative to the thickness direction of the mobile terminal, when the hinge is folded to be closed, the lifting flexible screen support member descends to a low position, when the hinge is unfolded, the lifting flexible screen support member is raised to a high position;

the rotating shaft of the rotating flexible screen support member is parallel to the rotating shaft of the left support member and the right support member, and the movement mechanism is provided with the rotating flexible screen support member at the end away from the middle support, when the lifting flexible screen support member descends, the rotating flexible screen support member rotates downwards, when the lifting flexible screen support member rises, the rotating flexible screen support member rotates upwards.

2. The hinge for a mobile terminal with a flexible screen according to claim 1, wherein the movement mechanism is connected to the corresponding left support member or right support member to be linked with the corresponding left support member or right support member.

3. The hinge for a mobile terminal with a flexible screen according to claim 1, wherein the end of the movement mechanism away from the middle support is connected to the corresponding left support member or right support member through a rotating flexible screen support member, the end of the rotating flexible screen support member away from the middle support is rotatably connected to the corresponding left support member or right support member, the end of the rotating flexible screen support member close to the middle support is connected to the lifting flexible screen support member and can slide and rotate relative to the lifting flexible screen support member, the left side and right side of the middle support are respectively connected to the left side and the right side of the lifting flexible screen support members through a connection mechanism; the lifting flexible screen support member is connected to the corresponding left support member or right support member to be linked with the corresponding left support member or right support member.

4. The hinge for a mobile terminal with a flexible screen according to claim 1, wherein the rotating flexible screen support member has a first sliding space opened above and is provided with a guide groove, and the guide groove is connected to a first sliding flexible screen support member, the first sliding flexible screen support member is in the first sliding space and can slide along the guide groove towards and away from the lifting flexible screen support member.

5. A mobile terminal with a flexible screen, provided with the hinge for a mobile terminal with a flexible screen of claim 4, wherein the flexible screen is connected to the left support member and right support member, rotating flexible screen support member and lifting flexible screen support member, first sliding flexible screen support member.

6. The mobile terminal with a flexible screen according to claim 5, wherein the lifting flexible screen support member has a second sliding space opened above and is provided with a guide groove, and the guide groove is connected to a second sliding flexible screen support member, the second sliding flexible screen support member is in the second sliding space and can slide along the guide groove towards and away from middle support, and the flexible screen is further connected to the second sliding flexible screen support member.

7. The hinge for a mobile terminal with a flexible screen according to claim 1, wherein the lifting flexible screen support member has a second sliding space opened above and is provided with a guide groove, and the guide groove is connected to a second sliding flexible screen support member, the second sliding flexible screen support member is in the second sliding space and can slide along the guide groove towards and away from middle support.

8. A mobile terminal with a flexible screen, provided with the hinge for a mobile terminal with a flexible screen of claim 7, wherein the flexible screen is connected to the left support member and right support member, rotating flexible screen support member and lifting flexible screen support member, and second sliding flexible screen support member.

9. The mobile terminal with a flexible screen according to claim 8, wherein the hinge is further provided with a middle lifting top block, and a lifting guide structure of the middle lifting top block is provided between the middle lifting top block and the middle support, the middle lifting top block is further connected to the left support member and right support member through a connecting structure to achieve linkage, and the lifting direction of the middle lifting top block is that the middle lifting top block rises to a high position when the hinge is folded to be closed, and the middle lifting top block descends to a low position when the hinge is unfolded; the flexible screen is further connected to the middle lifting top block.

10. The hinge for a mobile terminal with a flexible screen according to claim 1, wherein the left support member and the right support member are provided with a lifting guide chute of a lifting flexible screen support member, and the lifting flexible screen support member is slidably connected to the lifting guide chute of the corresponding left support member or right support member through a lifting guide shaft.

11. The hinge for a mobile terminal with a flexible screen according to claim 1, wherein the rotating flexible screen support member is provided with a guide groove, and is movably insertedly connected to the lifting guide shaft through the guide groove.

12. The hinge for a mobile terminal with a flexible screen according to claim 1, wherein the middle support is connected to the lifting flexible screen support member through a link.

13. The hinge for a mobile terminal with a flexible screen according to claim 1, wherein the middle support is connected to the lifting guide shaft of the lifting flexible screen support member through a link.

14. The hinge for a mobile terminal with a flexible screen according to claim 1, wherein the hinge is further provided with a synchronization mechanism to allow the left support member and right support member to rotate synchronously in a reverse direction.

15. The hinge for a mobile terminal with a flexible screen according to claim 1, wherein the left support member and right support member are a shell or a portion constituting a shell, respectively, such that a circuit board of the mobile terminal and components connected to the circuit board are arranged in the shell.

16. The hinge for a mobile terminal with a flexible screen according to claim 1, wherein the hinge is further provided with a middle lifting top block, the middle support is provided with a long hole along the width direction of the flexible screen, to guide the lifting of the middle lifting top block, the middle lifting top block is further connected to the left support member and the right support member through a connecting structure, to achieve linkage, the lifting direction of the middle lifting top block is that the middle lifting top block rises to a high position and protrudes out of the long hole when the hinge is folded to be closed, and the middle lifting top block descends to a low position when the hinge is unfolded, to support the middle portion of the unfolded flexible screen.

17. The hinge for a mobile terminal with a flexible screen according to claim 16, wherein the middle lifting top block further serves as a synchronization mechanism, to allow the left support member and right support member to rotate synchronously in a reverse direction.

18. The hinge for a mobile terminal with a flexible screen according to claim 17, wherein the middle lifting top block is rotatably connected to the left support member and right support member through a first link and a second link, respectively, and the first link and the second link are coaxially rotatably connected to the middle position of the middle lifting top block, the connecting shaft of the first link and the left support member is coaxial with the rotating shaft of the left support member and the middle support, and the connecting shaft of the second link and the right support member is coaxial with the rotating shaft of the right support member and the middle support.

19. A mobile terminal with a flexible screen, provided with the hinge for a mobile terminal with a flexible screen according to claim 16; wherein the flexible screen is connected to the left support member and right support member, rotating flexible screen support member and lifting flexible screen support member, and middle lifting top block.

20. A mobile terminal with a flexible screen, provided with the hinge for a mobile terminal with a flexible screen of claim 1, wherein the flexible screen is connected to the left support member and right support member, the rotating flexible screen support member and the lifting flexible screen support member.

21. The mobile terminal with a flexible screen according to claim 20, wherein the hinge is further provided with a middle lifting top block, and a lifting guide structure of the middle lifting top block is provided between the middle lifting top block and the middle support, the middle lifting top block is further connected to the left support member and right support member through a connecting structure to achieve linkage, and the lifting direction of the middle lifting top block is that the middle lifting top block rises to a high position when the hinge is folded to be closed, and the middle lifting top block descends to a low position when the hinge is unfolded; the flexible screen is further connected to the middle lifting top block.

* * * * *